(12) United States Patent
Hwang et al.

(10) Patent No.: US 8,554,238 B2
(45) Date of Patent: Oct. 8, 2013

(54) IDLE-TO-ACTIVE STATE SHIFT APPARATUS IN CARRIER AGGREGATION ENVIRONMENT

(75) Inventors: You Sun Hwang, Seoul (KR); Kyung-Yul Cheon, Daejeon (KR); Aesoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 107 days.

(21) Appl. No.: 12/974,855

(22) Filed: Dec. 21, 2010

(65) Prior Publication Data

US 2011/0151882 A1    Jun. 23, 2011

(30) Foreign Application Priority Data

Dec. 21, 2009  (KR) .................. 10-2009-0128239

(51) Int. Cl.
*H04W 72/00* (2009.01)

(52) U.S. Cl.
USPC ........ 455/450; 455/436; 455/458; 455/422.1; 370/329; 370/331; 370/341; 370/350

(58) Field of Classification Search
None
See application file for complete search history.

(56) References Cited

U.S. PATENT DOCUMENTS

| | | | |
|---|---|---|---|
| 2011/0002281 A1* | 1/2011 | Terry et al. ................... | 370/329 |
| 2011/0149913 A1* | 6/2011 | Park et al. .................... | 370/332 |
| 2011/0170495 A1* | 7/2011 | Earnshaw et al. ............. | 370/329 |
| 2012/0002635 A1* | 1/2012 | Chung et al. ................. | 370/329 |

FOREIGN PATENT DOCUMENTS

| | | |
|---|---|---|
| KR | 1020050000202 | 1/2005 |
| KR | 1020060056210 | 5/2006 |

* cited by examiner

*Primary Examiner* — Willie J Daniel, Jr.
(74) *Attorney, Agent, or Firm* — Nelson Mullins Riley & Scarborough LLP

(57) ABSTRACT

Provided is a technology that enables a terminal to quickly perform an idle-to-active state shift and to quickly perform a handover using a carrier aggregation characteristic. The terminal may attempt a Radio Resource Control (RRC) connection establishment using a plurality of carrier components. When the RRC connection establishment using one of the carrier components succeeds, the terminal may transmit an RRC reconfiguration complete message to a base station.

20 Claims, 7 Drawing Sheets

IDLE-TO-ACTIVE STATE SHIFT APPARATUS IN CARRIER AGGREGATION ENVIRONMENT

CROSS-REFERENCE TO RELATED APPLICATION

This application claims the benefit of Korean Patent Application No. 10-2009-0128239, filed on Dec. 21, 2009, in the Korean Intellectual Property Office, the disclosure of which is incorporated herein by reference.

BACKGROUND

1. Field of the Invention

The present invention relates to an idle-to-active state shift or handover, and more particularly, to an idle-to-active state shift or handover in a carrier aggregation environment.

2. Description of the Related Art

A carrier aggregation environment may be a technology of enhancing a data transmission efficiency by merging a plurality of carrier components.

FIG. 1A is a diagram to describe a frequency band in a carrier aggregation environment according to a conventional art.

It is assumed that a communication system of the carrier aggregation environment uses a first frequency band 110 and a third frequency band 130, and a second frequency band 120 is used by another communication apparatus.

The first frequency band 110 and the third frequency band 130 used by the communication system of the carrier aggregation environment may include a plurality of carrier components. For example, the first frequency band 110 may include carrier components 111, 112, 113, and 114, and the third frequency band 130 may include carrier components 131, 132, 133, and 134. The communication system may select at least one carrier component and transmit data using the selected at least one carrier component.

The communication system may select neighboring carrier components, for example, the carrier components 111 and 112, or may select separate carrier components, for example, the carrier components 111 and 113.

In addition, the communication system may select carrier components of separate frequency bands. For example, the communication system may select a carrier component positioned in the first frequency band 110, and a carrier component positioned in the third frequency 130.

The communication system may merge the selected carrier components, and may transmit data using the merged carrier component.

FIG. 1B is a diagram illustrating a relationship among a terminal 140 and a base station 150 included in a communication system, and each carrier component.

Referring to FIG. 1B, the terminal 140 may select two carrier components ($CC_1$ and $CC_2$) 141 and 142. The base station 150 may select four carrier components ($CC_a$, $CC_b$, $CC_c$, and $CC_d$) 151, 152, 153, and 154. When the terminal 140 and the base station 150 select the same carrier component, data may be transmitted between the terminal 140 and the base station 150.

For example, when the base station 150 selects fourth carrier components 111, 112, 113, and 114, the carrier components ($CC_a$, $CC_b$, $CC_c$, and $CC_d$) 151, 152, 153, and 154 usable by the base station 150 may correspond to the carrier components 111, 112, 113, and 114, respectively. In this case, when one of the carrier components ($CC_1$ and $CC_2$) 141 and 142 usable by the terminal 140 corresponds to one of the carrier components 111, 112, 113, and 114, data may be transmitted between the terminal 140 and the base station 150.

The conventional mobile communication system may perform an idle-to-active state shift or handover based on only a single carrier component.

FIG. 2A is a flowchart illustrating a conventional idle-to-active state procedure.

When an uplink packet occurs in a terminal 210, or when the terminal 210 receives a paging message from a base station 220 in operation S230, the terminal 210 may start shifting from an idle state to an active state.

In operation S240, the terminal 210 may perform a Radio Resource Control (RRC) connection establishment procedure through a random access procedure.

In operation S250, the terminal 210 may receive an RRC reconfiguration request message from the base station 220. The RRC reconfiguration message may include information used for the terminal 210 to establish a radio bearer.

In operation S260, the terminal 210 may establish the radio bearer, and may transmit an RRC reconfiguration complete message to the base station 220.

FIG. 2B is a flowchart illustrating a conventional handover procedure.

In operation S291, when a base station 280 determines to perform a handover, the base station 280 may transmit a handover start message to a terminal. The handover start message may be transmitted in a form of an RRC reconfiguration request message.

In operation S292, the terminal 270 may perform a handover according to the handover start message, and may transmit an RRC reconfiguration complete message to the base station 280.

In the conventional art, the state shift and the handover may be performed based on only a single carrier component.

SUMMARY

An aspect of the present invention is to quickly perform an idle-to-active state shift in a mobile communication system of a carrier aggregation environment.

Another aspect of the present invention is to quickly perform a handover in a mobile communication system of a carrier aggregation environment.

According to an aspect of the present invention, there is provided a terminal, including: a Radio Resource Control (RRC) connection establishment performing unit to perform an RRC connection establishment with respect to a base station using a first carrier component; a receiver to receive, from the base station, information associated with at least one second carrier component assigned to the terminal using the first carrier component; a bearer establishment unit to establish a bearer with respect to the first carrier component; and a state shifter to shift a state of the terminal to an active state according to a establishment complete of the bearer with respect to the first carrier component.

According to another aspect of the present invention, there is provided a base station, including: an RRC connection establishment performing unit to perform an RRC connection establishment with respect to a terminal using a first carrier component; a radio resource assignment unit to assign at last one second carrier component to the terminal; a transmitter to transmit information associated with the at least one second carrier component to the terminal; and a receiver to receive first data from the terminal using the first carrier component.

According to still another aspect of the present invention, there is provided a terminal, including: an RRC connection establishment performing unit to perform an RRC connection establishment with respect to a base station using a first carrier component; a receiver to receive, from the base station, an RRC reconfiguration request message containing information associated with at least one second carrier component assigned to the terminal using the first carrier component; a bearer establishment unit to establish a bearer with respect to the first carrier component; and a transmitter to transmit an RRC reconfiguration complete message to the base station according to an establishment complete of the bearer with respect to the first carrier component.

According to embodiments of the present invention, it is possible to quickly perform an idle-to-active state shift in a mobile communication system of a carrier aggregation environment.

Also, according to embodiments of the present invention, it is possible to quickly perform a handover in a mobile communication system of a carrier aggregation environment.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1A:
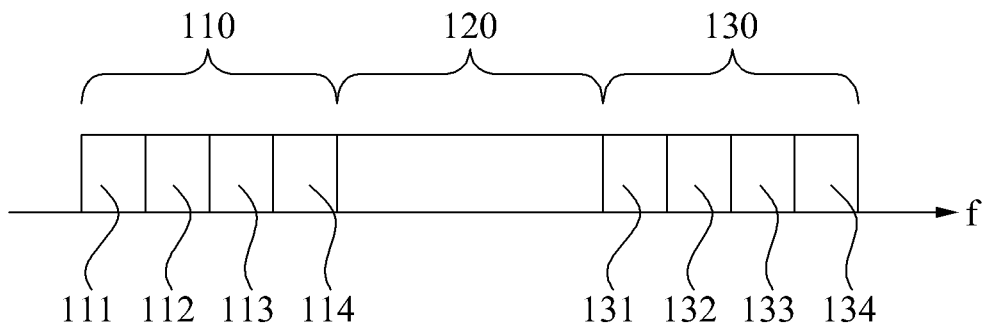
FIGS. 1A and 1B are diagrams to describe a concept of a carrier aggregation environment according to a conventional art.
Figure 1B:
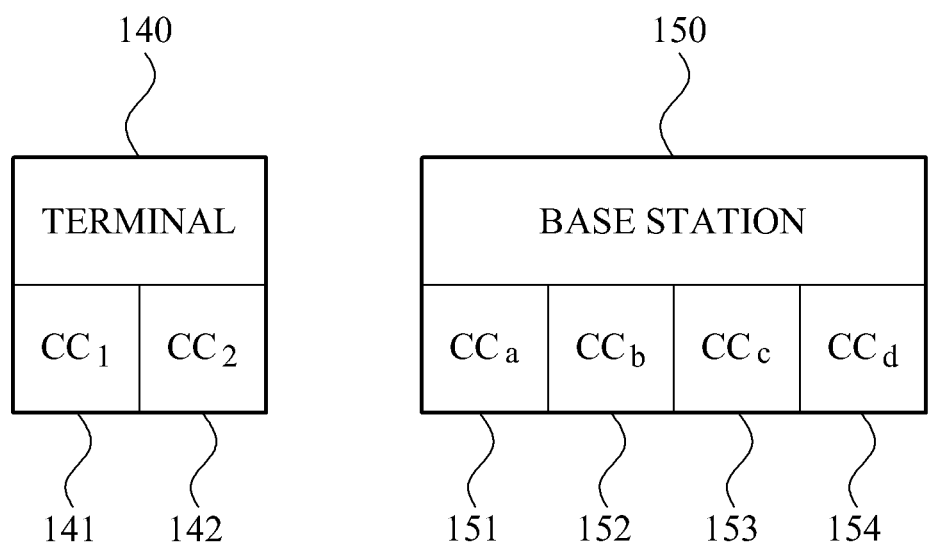
Figure 2A:
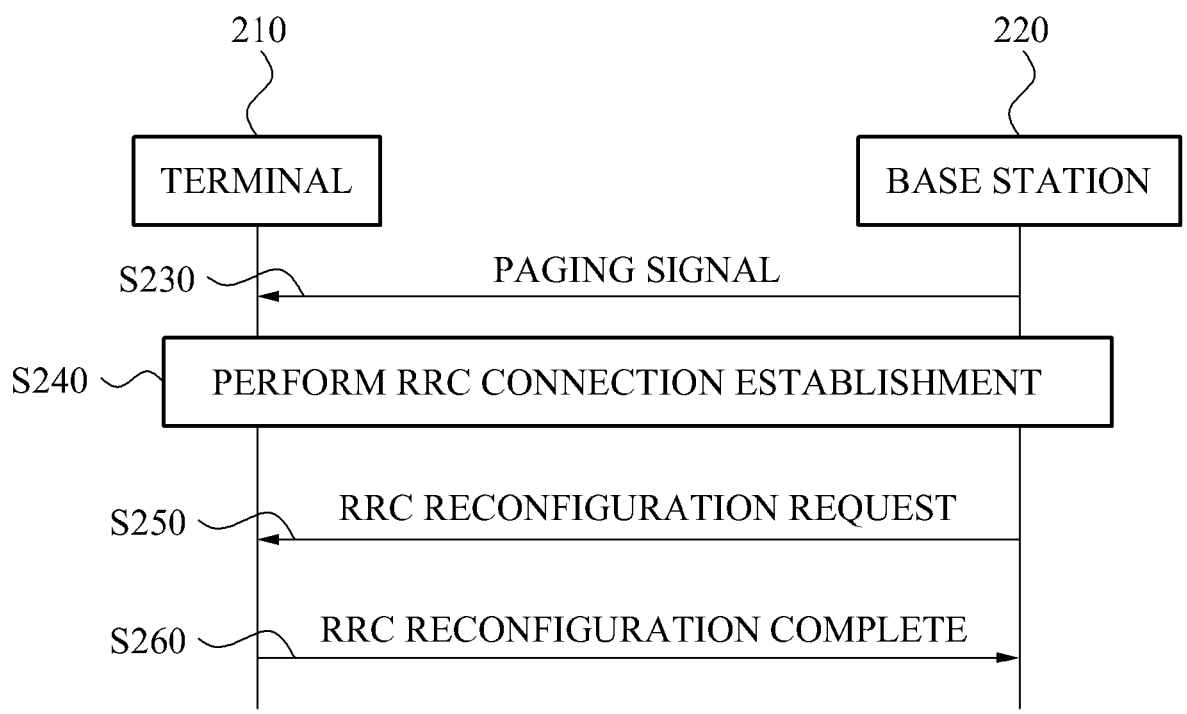
FIGS. 2A and 2B are flowcharts illustrating an idle-to-active state shift procedure and a handover procedure according to the conventional art.
Figure 2B:
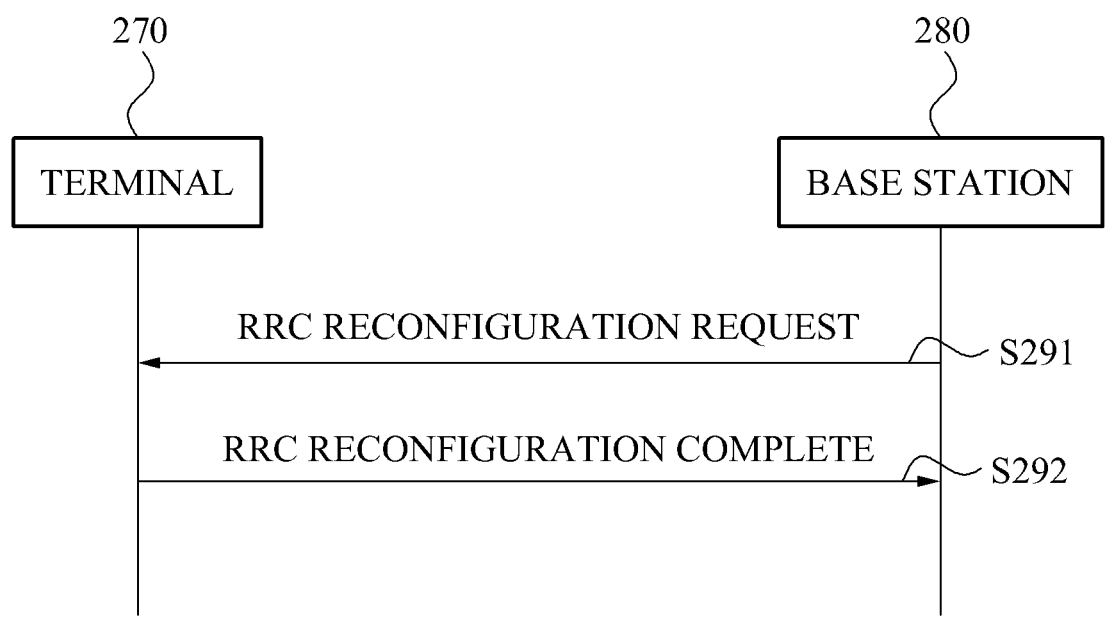

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 3:
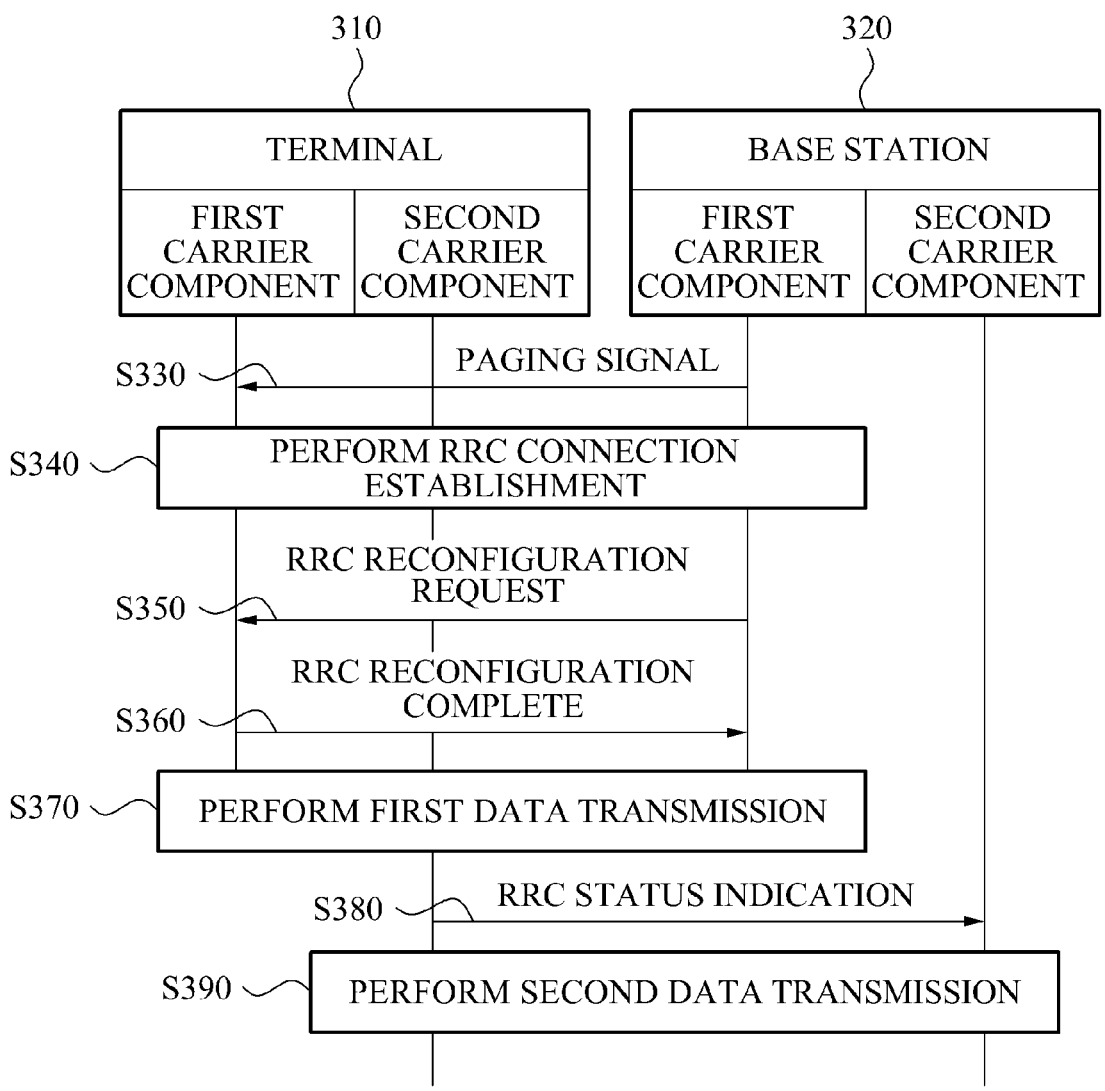
FIG. 3 is a flowchart illustrating a method of performing an idle-to-active state shift procedure and a handover procedure using a carrier aggregation characteristic according to an embodiment of the present invention.

FIG. 3 is a flowchart illustrating a method of performing an idle-to-active state shift procedure and a handover procedure using a carrier aggregation characteristic according to an embodiment of the present invention.

In operation S330, a terminal 310 may receive a paging signal from a base station 320. In FIG. 3, the terminal 310 may merge and thereby use a plurality of carrier components, for example, a first carrier component and a second carrier component. The base station 320 may also merge and thereby use a plurality of carrier components, for example, a first carrier component and a second carrier component. The first carrier component used by the terminal 310 may correspond to the first carrier component used by the base station 320. The second carrier component used by the terminal 310 may correspond to the second carrier component used by the base station.

In operation S340, in response to the paging signal, the terminal 310 may perform a Radio Resource Link (RRC) connection establishment with respect to the base station 320 using the first carrier component. The base station 320 may assign a number of carrier components assignable to the terminal 310 based on a current circumstance. For example, the base station 320 may assign at least one carrier component to the terminal 310 based on a load balancing of the base station 320 and the like.

In operation S350, the terminal 310 may receive information associated with at least one second carrier component assigned to the terminal 310, using the first carrier component. Information associated with the at least one second carrier component may include a number of second carrier components assigned to the terminal 310, or an identifier of each of the at least one second carrier component.

In operation S350, information associated with the at least one second carrier component may be included in an RRC reconfiguration request message and thereby be received.

In operation S360, the terminal 310 may establish a bearer with respect to the first carrier component. The terminal 310 may shift from an idle state to an active state according to an establishment complete of the bearer with respect to the first carrier component.

In operation S360, according to the establishment complete of the bearer with respect to the first carrier component, the terminal 310 may transmit an RRC reconfiguration complete message to the base station using the first carrier component.

In operation S370, the terminal 310 may transmit first data to the base station 320 using the bearer with respect to the first carrier component.

When an amount of data transmission increases, it may be insufficient to transmit data using only the first carrier component. In this case, the terminal 310 may transmit data using the second carrier component.

The terminal 310 may obtain a synchronization with respect to the second carrier component, and may establish a bearer with respect to the second carrier component. According to an establishment complete of the bearer with respect to the second carrier component, the terminal 310 may transmit an RRC status indication message to the base station 320.

In operation S390, the terminal 310 may transmit second data to the base station 320 using the bearer with respect to the second carrier component.

When the bearer with respect to the first carrier component is established, the terminal 310 capable of using the plurality of carrier components, for example, the first carrier component and the second carrier component may transmit the RRC reconfiguration complete message to the base station 320. Accordingly, compared to a case where the RRC reconfiguration complete message is transmitted to the base station 320 only when the bearer is established with respect to all of the first carrier component and the second carrier component, it is possible to quickly perform the handover.

When there is a need to establish the bearer with respect to the second carrier component, the bearer establishment may be additionally performed later. The terminal 310 may inform the base station 320 about the establishment complete of the bearer with respect to the second carrier component using the first carrier component of which the bearer is established. Accordingly, traffic or a service may be seamless even during the handover.

Figure 4:
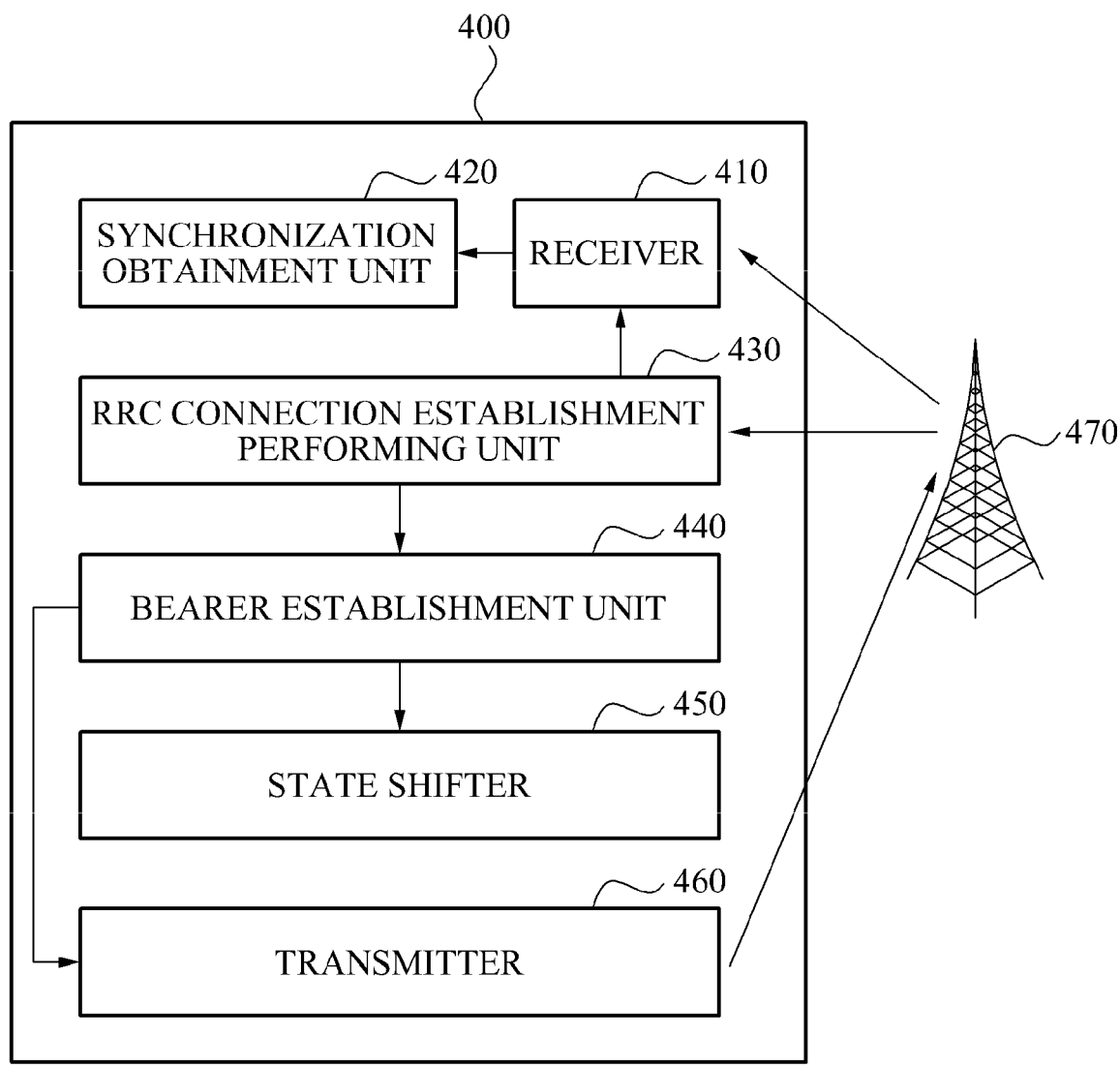
FIG. 4 is a block diagram illustrating a structure of a terminal according to an embodiment of the present invention.

FIG. 4 is a block diagram illustrating a structure of a terminal 400 according to an embodiment of the present invention.

Referring to FIG. 4, the terminal 400 may include a receiver 410, a synchronization obtainment unit 420, an RRC connection establishment performing unit 430, a bearer establishment unit 440, a state shifter 450, and a transmitter 460.

The receiver 410 may receive a paging signal from a base station 470.

In response to the paging signal, the RRC connection establishment performing unit 430 may perform an RRC connection establishment with respect to the base station 470 using a first carrier component. The base station 470 may assign a number of carrier components assignable to the terminal 400, based on a current circumstance. The RRC connection establishment performing unit 430 may perform the RRC connection establishment using the first carrier component.

The receiver 410 may receive information associated with at least one second carrier component assigned to the terminal 400, using the first carrier component. Information associated with the at least one second carrier component may include a number of second carrier components assigned to the terminal 400 or an identifier of each of the at least one second carrier component.

Information associated with the at least one second carrier component may be included in a RRC reconfiguration request message and thereby be received.

The bearer establishment unit 440 may establish a bearer with respect to the first carrier component.

Also, the state shifter 450 may shift a state of the terminal 400 from an idle state to an active state according to an establishment complete of the bearer with respect to the first carrier component.

According to the establishment complete of the bearer with respect to the first carrier component, the transmitter 460 may transmit an RRC reconfiguration complete message to the base station 470 using the first carrier component.

The transmitter 460 may transmit first data to the base station 470 using the bearer with respect to the first carrier component.

The synchronization obtainment unit 420 may obtain a synchronization with respect to the at least one second carrier component, and the bearer establishment unit 440 may establish a bearer with respect to the at least one second carrier component. According to the establishment complete of the bearer with respect to the at least one second carrier component, the transmitter 460 may transmit an RRC status indication message to the base station 470.

The transmitter 460 may transmit second data to the base station 470 using the bearer with respect to the at least one second carrier component.

Figure 5:
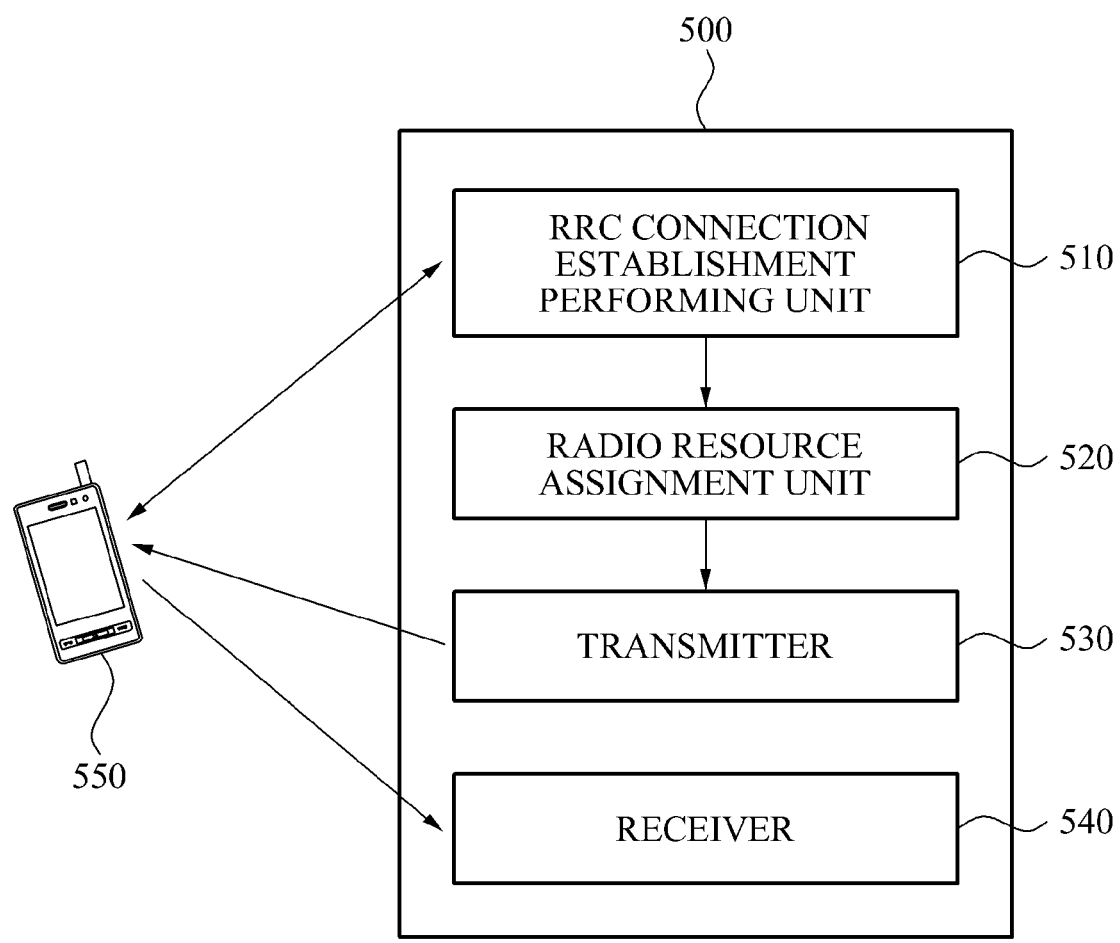
FIG. 5 is a block diagram illustrating a structure of a base station according to an embodiment of the present invention.

FIG. 5 is a block diagram illustrating a structure of a base station 500 according to an embodiment of the present invention.

Referring to FIG. 5, the base station 500 may include an RRC connection establishment performing unit 510, a radio resource assignment unit 520, a transmitter 530, and a receiver 540.

The transmitter 530 may transmit a paging signal to a terminal 550.

In response to the paging signal, the terminal 550 may perform an RRC connection establishment.

In this case, the RRC connection establishment performing unit 510 may perform an RRC connection establishment with the terminal 550. The RRC connection establishment performing unit 510 may perform the RRC connection establishment using a first carrier component.

The radio resource assignment unit 520 may assign at least one second carrier component with respect to the terminal 550. A number of second carrier components assigned to the terminal 550 may be determined based on a communication environment of the base station 500.

The transmitter 530 may transmit information associated with the at least one second carrier component to the terminal 550. Information associated with the at least one second carrier component may include the number of second carrier components assigned to the terminal 550 or an identifier of each of the at least one second carrier component.

The transmitter 530 may include information associated with the at least one second carrier component in the RRC reconfiguration request message and thereby transmit the RRC reconfiguration request message to the terminal 550.

The terminal 550 may establish a bearer with respect to the first carrier component based on the RRC reconfiguration request message. According to an establishment complete of the bearer with respect to the first carrier component, the receiver 540 may receive an RRC reconfiguration complete message indicating the establishment complete of the bearer with respect to the first carrier component. In this case, the receive 540 may receive first data from the terminal 550 using the bearer with respect to the first carrier component.

The terminal 550 may establish the bearer with respect to the at least one second component. In this case, the receiver 540 may receive, from the terminal 550, an RRC status indication message indicating the establishment complete of the bearer with respect to the at least one second carrier component. The receiver 540 may receive second data from the terminal 550 using the bearer with respect to the at least one second carrier component.

Figure 6:
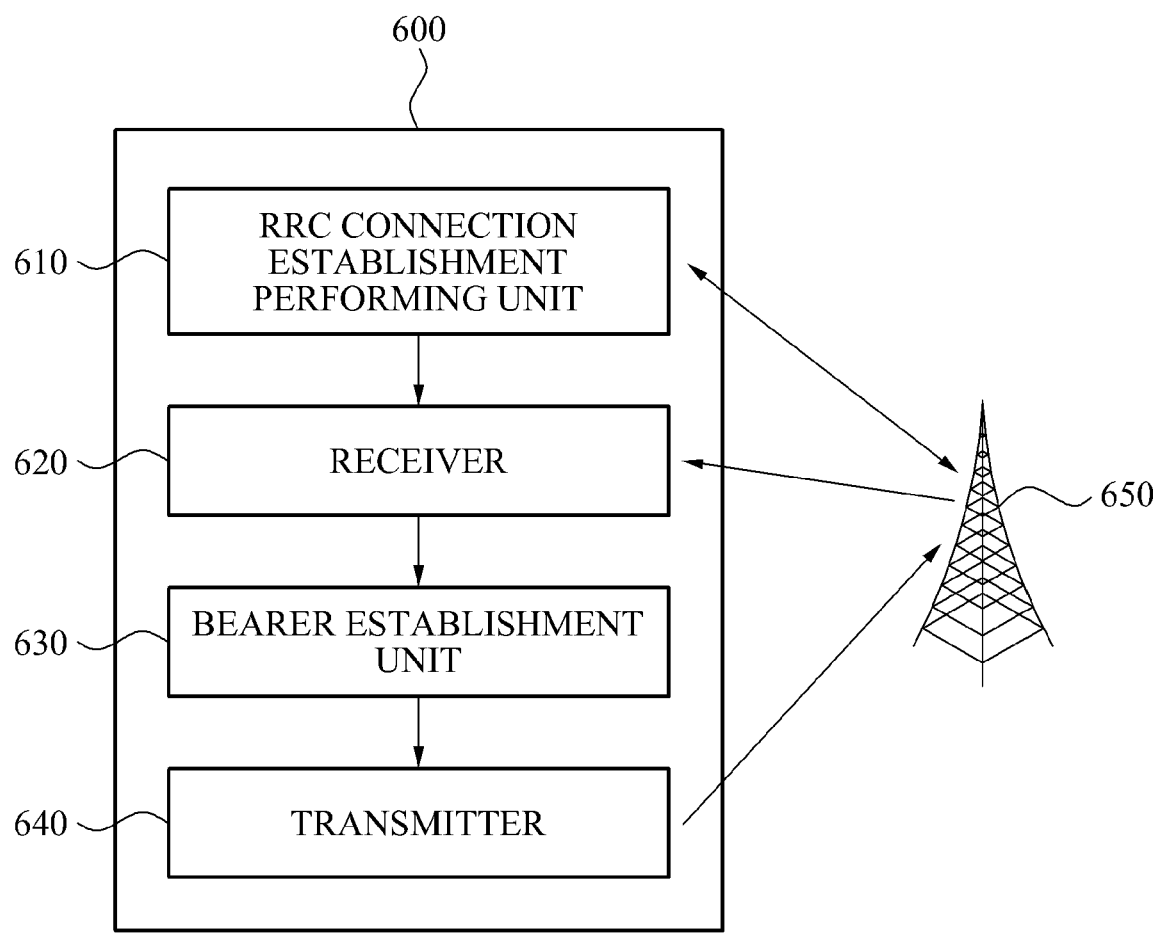
FIG. 6 is a block diagram illustrating a structure of a terminal according to another embodiment of the present invention.

FIG. 6 is a block diagram illustrating a structure of a terminal 600 according to another embodiment of the present invention.

Referring to FIG. 6, the terminal 600 may include an RRC connection establishment performing unit 610, a receiver 620, a bearer establishment unit 630, and a transmitter 640.

The receiver 620 may receive a paging signal from a base station 650.

In response to the paging signal, the RRC connection establishment performing unit 610 may perform an RRC connection establishment with respect to the base station 650. The RRC connection establishment performing unit 610 may perform the RRC connection establishment using a first carrier component.

The base station 650 may assign at least one second carrier component to the terminal 600. The base station 650 may transmit information associated with the at least one second carrier component to the terminal 600 using the first carrier component.

The receiver 620 may receive information associated with the at least one second carrier component using the first carrier component. Information associated with the at least one second carrier component may be included in an RRC reconfiguration request message and thereby be received.

Information associated with the at least one second carrier component may include a number of second carrier components assigned to the terminal 600 or an identifier of each of the at least one second carrier component.

The bearer establishment unit 630 may establish a bearer with respect to the first carrier component. According to the establishment complete of the bearer with respect to the first carrier component, the transmitter 640 may transmit an RRC reconfiguration complete message to the base station 650.

The transmitter 640 may transmit data to the base station 650 using the bearer with respect to the first carrier component.

When a data transmission using the at least one second carrier component is requested, the bearer establishment unit 630 may establish a bearer with respect to the at least one second carrier component. The transmitter 640 may transmit an RRC status indication message to the base station according to the establishment complete of the bearer with respect to the at least one second carrier component.

The transmitter 640 may transmit second data to the base station 650 using the bearer with respect to the at least one second carrier component.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A terminal, comprising:
  a Radio Resource Control (RRC) connection establishment performing unit to perform an RRC connection establishment with respect to a base station using a first carrier component;
  a receiver to receive, from the base station, information associated with at least one second carrier component assigned to the terminal using the first carrier component;
  a bearer establishment unit to establish a bearer with respect to the first carrier component; and
  a state shifter to shift a state of the terminal to an active state according to a establishment complete of the bearer with respect to the first carrier component,
  wherein the terminal attempts the RRC connection establishment using a plurality of carrier components, and when the RRC connection is established using one of the carrier components, the terminal transmits an RRC reconfiguration complete message to the base station or shifts the state of the terminal to the active state,
  wherein the terminal transmits the RRC reconfiguration complete message to the base station or shifts the state of the terminal to the active state when the bearer with respect to the first carrier component is established and a bearer with respect to the second carrier component is not established.

2. The terminal of claim 1, further comprising:
  a transmitter to transmit, to the base station, an RRC reconfiguration complete message using the first carrier component according to the establishment complete of the bearer with respect to the first carrier component.

3. The terminal of claim 2, wherein the transmitter transmits data to the base station using the bearer with respect to the first carrier component.

4. The terminal of claim 1, wherein information associated with the at least one second carrier component is comprised in an RRC reconfiguration request message and thereby is received.

5. The terminal of claim 1, further comprising:
  a synchronization obtainment unit to obtain a synchronization with respect to the at least one second carrier component,
  wherein the bearer establishment unit establishes a bearer with respect to the at least one second carrier component, and the transmitter transmits data to the base station using the bearer with respect to the at least one second carrier component.

6. The terminal of claim 5, wherein the transmitter transmits RRC status indication message to the base station according to the establishment complete of the bearer with respect to the at least one second carrier component.

7. The terminal of claim 1, wherein:
  the receiver receives a paging signal from the base station, and
  the RRC connection establishment is performed in response to the paging signal.

8. The terminal of claim 1, wherein information associated with the at least one second carrier component comprises a number of second carrier components or an identifier of each of the at least one second carrier component.

9. A base station, comprising:
  an RRC connection establishment performing unit to perform an RRC connection establishment with respect to a terminal using a first carrier component;
  a radio resource assignment unit to assign at last one second carrier component to the terminal;
  a transmitter to transmit information associated with the at least one second carrier component to the terminal; and
  a receiver to receive first data from the terminal using the first carrier component,
  wherein the terminal attempts the RRC connection establishment using a plurality of carrier components, and when the RRC connection is established using one of the carrier components, the terminal transmits an RRC reconfiguration complete message to the base station or shifts a state of the terminal to an active state,
  wherein the terminal transmits the RRC reconfiguration complete message to the base station or shifts the state of the terminal to the active state when a bearer with respect to the first carrier component is established and a bearer with respect to the second carrier component is not established.

10. The base station of claim 9, wherein the receiver receives an RRC status indication message indicating an establishment complete of a bearer with respect to the at least one second carrier component of the terminal, and receives second data from the terminal using the bearer with respect to the at least one second carrier component.

11. The base station of claim 9, wherein:
  the transmitter transmits a paging signal to the terminal, and
  the RRC connection establishment is performed in response to the paging signal.

12. The base station of claim 9, wherein the receiver receives an RRC reconfiguration complete message indicating an establishment complete of a bearer with respect to the first carrier component of the terminal, and receives the first data using the bearer with respect to the first carrier component, according to the RRC reconfiguration complete message.

13. The base station of claim 9, wherein the transmitter comprises, in an RRC reconfiguration request message, information associated with the at least one second carrier component, and thereby transmits the RRC reconfiguration request message.

14. The base station of claim 9, wherein information associated with the at least one second carrier component comprises a number of second carrier components or an identifier of each of the at least one second carrier component.

15. A terminal, comprising:
an RRC connection establishment performing unit to perform an RRC connection establishment with respect to a base station using a first carrier component;
a receiver to receive, from the base station, an RRC reconfiguration request message containing information associated with at least one second carrier component assigned to the terminal using the first carrier component;
a bearer establishment unit to establish a bearer with respect to the first carrier component; and
a transmitter to transmit an RRC reconfiguration complete message to the base station according to an establishment complete of the bearer with respect to the first carrier component,
wherein the terminal attempts the RRC connection establishment using a plurality of carrier components, and when the RRC connection is established using one of the carrier components, the terminal transmits the RRC reconfiguration complete message to the base station or shifts a state of the terminal to an active state,
wherein the terminal transmits the RRC reconfiguration complete message to the base station or shifts the state of the terminal to the active state when the bearer with respect to the first carrier component is established and a bearer with respect to the second carrier component is not established.

16. The terminal of claim 15, wherein the transmitter transmits data to the base station using the bearer with respect to the first carrier component.

17. The terminal of claim 15, wherein information associated with the second carrier component comprises a number of second carrier components or an identifier of the second carrier component.

18. The terminal of claim 17, wherein the transmitter transmits data to the base station using a bearer with respect to the second carrier component.

19. The terminal of claim 15, wherein:
the bearer establishment unit to establish a bearer with respect to the second carrier component, and
the transmitter transmits an RRC status indication message to the base station according to an establishment complete of the bearer with respect to the second carrier component.

20. The terminal of claim 15, wherein:
the receiver receives a paging signal from the base station, and
the RRC connection establishment is performed in response to the paging signal.

* * * * *